(12) United States Patent
Lignon

(10) Patent No.: US 7,327,461 B2
(45) Date of Patent: Feb. 5, 2008

(54) METHOD OF CONTROLLING A LASER GYRO BY THE AMPLITUDE OF THE WINKING SIGNAL

(75) Inventor: Christian Lignon, Argenteuil (FR)

(73) Assignee: Sagem SA, Paris (FR)

( * ) Notice: Subject to any disclaimer, the term of this patent is extended or adjusted under 35 U.S.C. 154(b) by 180 days.

(21) Appl. No.: 11/104,557

(22) Filed: Apr. 13, 2005

(65) Prior Publication Data

US 2005/0231726 A1    Oct. 20, 2005

(30) Foreign Application Priority Data

Apr. 14, 2004 (FR) .................................. 04 03909

(51) Int. Cl.
*G01C 19/68* (2006.01)
(52) U.S. Cl. ..................................................... 356/473
(58) Field of Classification Search ................ 356/472, 356/473
See application file for complete search history.

(56) References Cited

U.S. PATENT DOCUMENTS 4,152,071 A * 5/1979 Podgorski ................... 356/473
4,473,297 A    9/1984 Simpson et al.
4,686,683 A * 8/1987 Martin ........................ 356/472
4,783,169 A * 11/1988 Matthews et al. ........... 356/473
5,442,442 A * 8/1995 Kanegsberg et al. ........ 356/473
5,606,416 A * 2/1997 Son et al. .................... 356/473

FOREIGN PATENT DOCUMENTS

FR         2 360 885 A       3/1978

* cited by examiner

Primary Examiner—Samuel A. Turner
(74) Attorney, Agent, or Firm—Birch, Stewart, Kolasch & Birch, LLP

(57) ABSTRACT

A push-pull method of controlling a laser gyro. At least three mirrors form a closed-loop light path for two laser beams propagating in opposite directions, which is subjected to movement. At least two of the mirrors are associated with actuators connected to push-pull control members for controlling the positions of the mirrors to minimize the amplitude of the winking signal which occurs in a lased intensity signal of the laser beams. The method includes detecting the frequency of the winking signal of at least one laser beam, and of triggering the measurement of the amplitude of the winking signal when the frequency of the winking signal is less than a predetermined threshold corresponding to passing into a dead band of the gyro.

10 Claims, 1 Drawing Sheet

METHOD OF CONTROLLING A LASER GYRO BY THE AMPLITUDE OF THE WINKING SIGNAL

The present invention relates to a push-pull method of controlling a laser gyro.

BACKGROUND OF THE INVENTION

A laser gyro is known, in particular from document FR 2 360 885 (U.S. Pat. No. 4,152,071), that comprises three mirrors placed to implement a closed-loop light path for two laser beams propagating in opposite directions and modulated at identical frequencies. It is known that when the gyro is at rest, the two beams follow paths of the same length and therefore remain at frequencies that are identical, whereas when the gyro is caused to rotate, the two beams follow paths that are unequal and therefore oscillate at different frequencies, with the frequency difference being representative of the angular speed of the gyro. This frequency difference is measured by means of an interferometer serving to measure the optical phase between the two beams.

The operation of a laser gyro is satisfactory for speeds of rotation greater than a critical value that depends on the quality with which the gyro is made and in particular on the quality with which the mirrors in the gyro are made. Typically, the critical value for the speed of rotation of the gyro is of the order of one hundred degrees per hour. For speeds of rotation lying in a zone known as the "dead band" for which the value of the speed of rotation is less than the critical value, it has been found that coupling exists between the beams such that the real speed of the gyro can no longer be measured by taking the difference between the oscillation frequencies of the laser beams.

In order to enable speed of rotation to be measured in the dead band, the above-mentioned document discloses subjecting the real rotary motion of the gyro to superposed noisy sinusoidal reciprocating drive motion referred to as dither movement, at a speed that is substantially greater than the critical value for the real speed of rotation of the gyro. The dead zone of the gyro is then replaced by a series of dead zone crossings each time the dither movement reverses, and the performance of the gyro is then limited by a random walk movement which is the integral of the gyro measurement errors occurring on each crossing of the dead band. These errors are, to a large extent, due to energy being exchanged between the two laser beams giving rise to variation in the two laser intensities as a function of optical phase. This variation is known as "winking". In order to obtain high performance from the gyro, it is therefore necessary to reduce winking.

In order to reduce winking, the above-mentioned document discloses actuating two of the mirrors of the gyro under push-pull control, causing the distance between the mirrors to vary, while keeping the total optical path length of the laser beams constant. Push-pull control makes it possible to vary phase between back-scattering from different locations so as to minimize overall back-scatter. Back-scatter can be measured via its consequences on the lased intensity of one of the laser beams by observing the winking of the lased intensity signal.

In order to ensure that push-pull control is as appropriate as possible, it is preferable for the amplitude in the oscillations of the lased intensity to be measured in the dead band since energy exchanges therein give rise to the largest amount of gyro error. To this end, the above-mentioned document starts from the assumption that the amplitude of the lased intensity increases on crossing the dead band, and it therefore proposes measuring the maximum amplitude of the lased intensity signal.

Nevertheless, it has been found that that initial assumption is not always true, with the amplitude of the lased intensity outside the dead band being capable, under certain conditions, of taking values that are greater than the amplitude of the lased intensity in the dead band. The method of the above-mentioned document then leads to errors in measuring winking and consequently to errors in implementing push-pull control.

OBJECT OF THE INVENTION

An object of the present invention is to propose a push-pull method of controlling a laser gyro by improving measurement of the amplitude of the winking signal so that this measurement takes place accurately in the dead band of the gyro.

SUMMARY OF THE INVENTION

In order to achieve this object, the invention provides a push-pull method of controlling a laser gyro comprising at least three mirrors for implementing a closed loop light path for two laser beams propagating in opposite directions, the gyro also being subjected to dither movement, at least two mirrors being associated with respective actuators connected to push-pull control members for controlling the positions of the mirrors so as to minimize the amplitude of a winking signal occurring in a lased intensity signal of the laser beams, the method including the steps of detecting the frequency of the winking signal of at least one laser beam, and of triggering measurement of the amplitude of the winking signal when the frequency of the winking signal is less than a predetermined threshold corresponding to passing into a dead band of the gyro.

From an observation forming part of the invention, it has been found that contrary to the amplitude of the winking signal which is not always at a maximum in the dead band, the frequency of the winking signal in the dead band is always lower than the frequency of the winking signal outside the dead band. It is thus possible, by measuring the frequency of the winking signal, to determine accurately those instants at which the measurement of the amplitude of the winking signal need to be performed in order to obtain satisfactory push-pull control. The performance of the gyro is thus improved.

In a preferred implementation of the invention, the gyro includes an interferometer receiving the laser beams and generating therefrom an interference signal comprising two fringe signals that are substantially in quadrature, and the method includes the steps of filtering at least one fringe signal with high-pass filtering, comparing the amplitude of the filtered signal with the predetermined threshold corresponding to passing into the dead band, and triggering measurement of the amplitude of the winking signal when the filtered signal is less than the predetermined threshold. The amplitude of the filter signal is representative of the frequency of the winking signal so that the precise instant at which the amplitude of the winking signal is measured is determined by means that are simple and robust.

According to other aspects of this preferred implementation of the invention, the method includes the steps of filtering the fringe signals by means of a high-pass filter, of rectifying them, and of summing the filtered signals to produce a sum signal prior to performing low-pass filtering and then comparison with the predetermined threshold. Since the two fringe signals are in quadrature, measurement of the amplitude of the filtered signals is thus improved.

According to another advantageous aspect of the invention, the predetermined threshold is modulated as a function of the peak-to-peak amplitude of one of the fringe signals. This matches the predetermined threshold to the instantaneous power of the laser beams so that the accuracy with which the trigger threshold is detected is independent of the power of the laser beams.

BRIEF DESCRIPTION OF THE DRAWING

Other characteristics and advantages of the invention appear on reading the following description of a particular, non-limiting implementation of the invention given with reference to the sole accompanying FIGURE which is a diagram of a laser gyro of the invention and of various steps in the method.

DETAILED DESCRIPTION OF THE INVENTION

Figure 1:
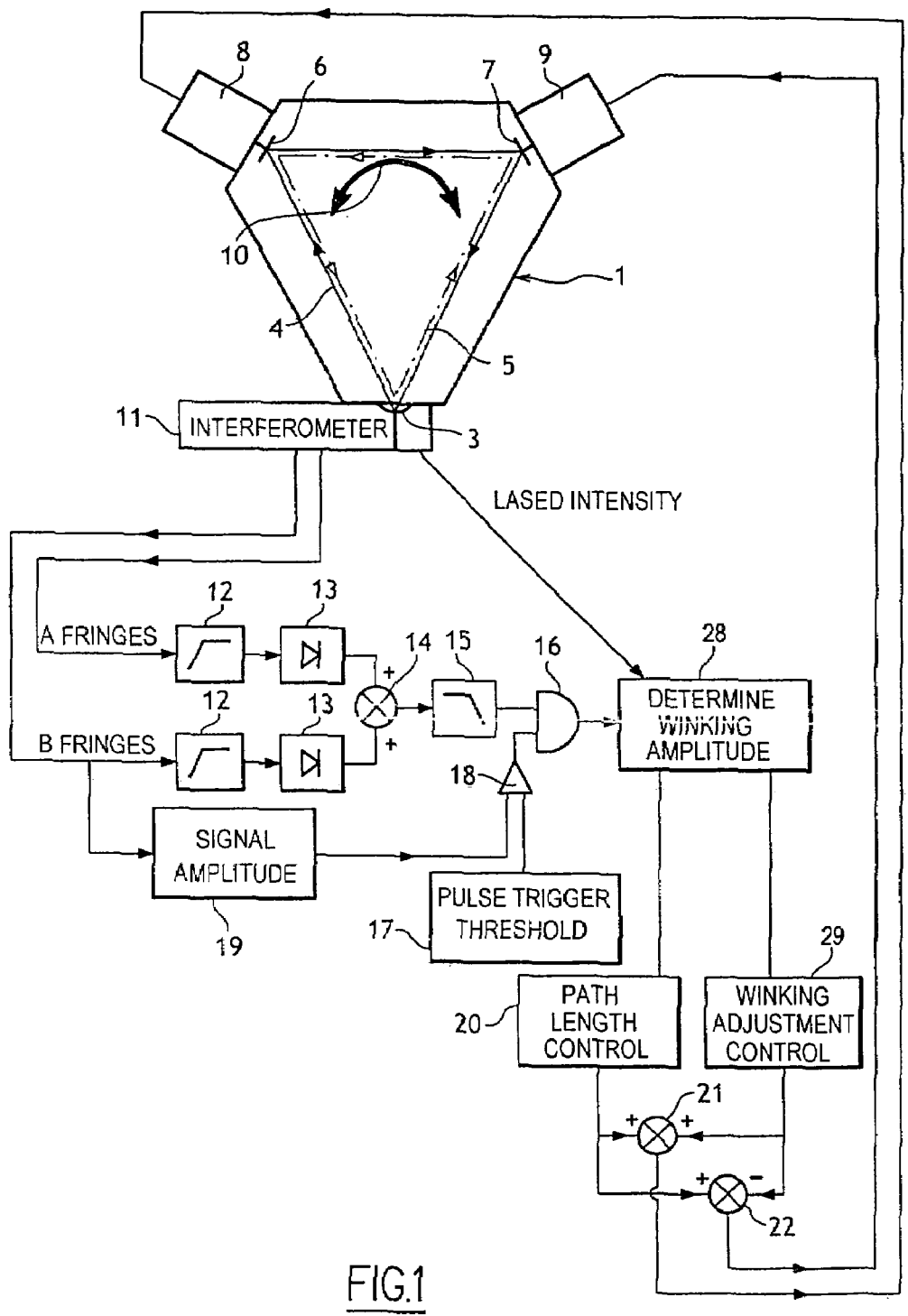

With reference to the FIGURE, the laser gyro 1 comprises, in conventional manner, a semi-reflecting mirror 3 for generating a laser beam 4 represented by a continuous line which propagates in a clockwise direction, and a laser beam 5, represented by a chain-dotted line, which propagates in an anticlockwise direction. The laser beams 4 and 5 are reflected by mirrors 6 and 7 associated with respective actuators 8 and 9 so as to follow a triangular path around a closed loop. The gyro 1 also has a drive member for subjecting the gyro to sinusoidal dither movement and represented by double-headed arrow 10, whenever the gyro is subjected to a speed of rotation that is less than the critical speed.

Also in conventional manner, the gyro 1 includes an interferometer 11 serving to take samples from the laser beams 4 and 5 and to generate two fringe signals in quadrature.

In the particular implementation of the invention shown, each of the fringe signals is sent to a high-pass filter 12 having a cutoff frequency of about 50 kilohertz (kHz) in order to obtain from the fringe signal a signal having amplitude that is representative of the frequency of the fringes. Each of the filtered signals obtained in this way is rectified by a rectifier member 13 and the signals are added together in an adder 14. The resulting sum signal is subjected to low-pass filtering 15 in order to eliminate the alternating noise component in the sum signal. The amplitude of the result signal is compared in a comparator 16 with a predetermined threshold 17 that is representative of the fringe frequency on entering into the dead band of the gyro. In this content, it should be observed that the signal that results from the high-pass filtering 12 is representative not only of the frequency of the fringes, but also of the power of the laser beams. In order to avoid errors when comparing it with the predetermined threshold 17, the threshold is preferably modulated by a compensation member 18 as a function of the peak-to-peak amplitude 19 as measured on one of the fringe signals.

Furthermore, the lased intensity of one of the laser beams 4 and 5 is measured, e.g. by means of a photodiode, associated with a sample-taking prism and with a high-pass filter having a cut-off frequency of about 100 hertz (Hz) in order to extract from the lased intensity signal the alternating value that is representative of the winking signal.

When the comparator 16 detects entry into a dead band, it sends a pulse to a processor unit 28 to perform the steps of determining the amplitude of the winking signal.

According to an aspect of the invention, the amplitude of the winking signal is determined digitally by sampling the winking signal at the instant of the pulse that corresponds to crossing the dead band, and by grouping together measurements performed during a plurality of dead band crossings in order to determine the amplitude of the winking signal. For this purpose, the winking component extracted from the lased intensity by the high-pass filter as mentioned above is transmitted to an analog-to-digital converter and the sampled values are stored.

In a preferred implementation of the method of the invention, the amplitude of winking is estimated on the basis of a standard deviation given by the formula:

$$\sigma^2 = \frac{1}{n}\sum(W^2)$$

where σ is the standard deviation, n is the number of points measured during various crossings through the dead band, and W is the winking value for each point. n is selected as a function of the frequency desired for push-pull activation, and in order to simplify calculation, n is preferably a power of two.

The determined winking amplitude serves to generate a winking adjustment control 29 and a path length control 20 for positioning the mirrors 6 and 7 of the gyro 1. In this context, it should be observed that in the above-mentioned prior document, the winking adjustment control is applied to one of the mirror actuators while the path length control is applied to the other mirror actuator. In an aspect of the present invention, better decoupling between these two servo-controls is obtained by controlling one of the actuators (the actuator 8 in the FIGURE) using a voltage representative of the sum of the winking adjustment control and the path length control, and controlling the other actuator (the actuator 9 in the FIGURE) by a voltage representative of the difference between the path length control and the winking adjustment control, as symbolized by the adders 21 and 22 in the FIGURE.

In order to avoid disturbing normal operation of the gyro, the method of the invention is preferably implemented only when the input speed of the gyro is less than or equal to 0.8 times the dither movement speed.

Naturally, the invention is not limited to the implementation described and variations can be applied thereto without going beyond the ambit of the invention as defined by the claims.

In particular, although the method of the invention is described in terms of providing parallel processing on each of the two fringe signals and then by summing the resulting signal, it is possible to determine the instant of a dead zone crossing by performing processing on one only of the groups of fringes, in particular when noise is small compared with fringe amplitude.

Similarly, when the power of the laser beams is sufficiently constant, it is possible to trigger determination of winking amplitude after performing a comparison with a trigger threshold 17 that is not modulated.

More generally, it is possible to use any means for measuring variations in the frequency of the winking signal in order to trigger the instant at which the winking amplitude is measured.

What is claimed is:

1. A push-pull method of controlling a laser gyro comprising:
   providing at least three mirrors for implementing a closed loop light path for two laser beams propagating in opposite directions,
   subjecting the gyro also to dither movement,
   providing actuators which are associated with at least two mirrors, said actuators being connected to push-pull control members for controlling the positions of the mirrors so as to minimize the amplitude of a winking signal occurring in a lased intensity signal of the laser beams,
   measuring a frequency of the winking signal of at least one laser beam,
   triggering measurement of an amplitude of the winking signal when the measured frequency of the winking signal is less than a predetermined threshold corresponding to passing into a dead band of the gyro, and
   controlling said actuators through said push-pull control members through the measurement of the amplitude of the winking signal.

2. A method according to claim 1, further comprising:
   providing the gyro with an interferometer receiving the laser beams and generating therefrom an interference signal comprising two fringe signals that are substantially in quadrature, and
   filtering at least one fringe signal with high-pass filtering, and
   comparing an amplitude of the filtered signal with the predetermined threshold corresponding to passing into the dead band, to trigger said measurement of the amplitude of the winking signal when the filtered signal is less than the predetermined threshold.

3. A method according to claim 2, further comprising rectifying the filtered signal before the step of comparison with the predetermined threshold.

4. A method according to claim 3, further comprising filtering the two fringe signals, rectifying the resulting signal, and adding the rectified signal to produce a sum signal prior to performing a comparison with the predetermined threshold.

5. A method according to claim 4, further comprising smoothing the sum signal by low-pass filtering prior to being compared with the predetermined threshold.

6. A method according to claim 2, further comprising modulating the predetermined threshold as a function of the amplitude of one of the fringe signals.

7. A method according to claim 2, the step of measuring the amplitude of the winking signal includes sampling the winking signal extracted from a lased intensity of one of the laser beams.

8. A method according to claim 7 the step of measuring the amplitude of the winking signal includes taking measurements on a plurality of dead-bang crossings, calculating the amplitude of the winking signal based on the measurements of the dead-bang crossing, and providing an output to control the push-pull control members.

9. A method according to claim 1 wherein an entry speed of the gyro is less than or equal to 0.8 times a maximum speed for the dither movement.

10. A method according to claim 1, further comprising controlling the push-pull control by applying to one mirror actuator a signal representative of the sum of a path length control and a winking adjustment control, and by applying to another mirror actuator a signal representative of a difference between the path length control and the winking adjustment control.

* * * * *